May 20, 1969  A. J. THOMSON  3,444,610

MANUFACTURE OF CLAD WIRE AND THE LIKE

Filed Nov. 3, 1966

United States Patent Office 3,444,610
Patented May 20, 1969

3,444,610
MANUFACTURE OF CLAD WIRE AND THE LIKE
Arthur J. Thomson, Cumberland, R.I., assignor to Texas Instruments Incorporated, Dallas, Tex., a corporation of Delaware
Filed Nov. 3, 1966, Ser. No. 591,752
Int. Cl. B23k 21/00, 31/00, 35/38
U.S. Cl. 29—470.1     9 Claims This invention relates to a method and apparatus for solid-phase bonding of core and cladding materials to make clad wire and the like, and with regard to certain more specific features, to improved cleaning of such core and cladding materials for such bonding.

Among the several objects of the invention may be noted the provision of economical and reliable apparatus and a method for the cleaning of core and cladding materials in preparation for solid-phase bonding to produce clad wire or the like; the provision of such apparatus which will permit of solid-phase bonding by rolling under very light reduction on the order of 3% to 7% or so; and the provision of high-speed apparatus of this class. Other objects and features will be in part apparent and in part pointed out hereinafter.

The invention accordingly comprises the methods and constructions hereinafter described, the scope of the invention being indicated in the following claims.

Figure 1:
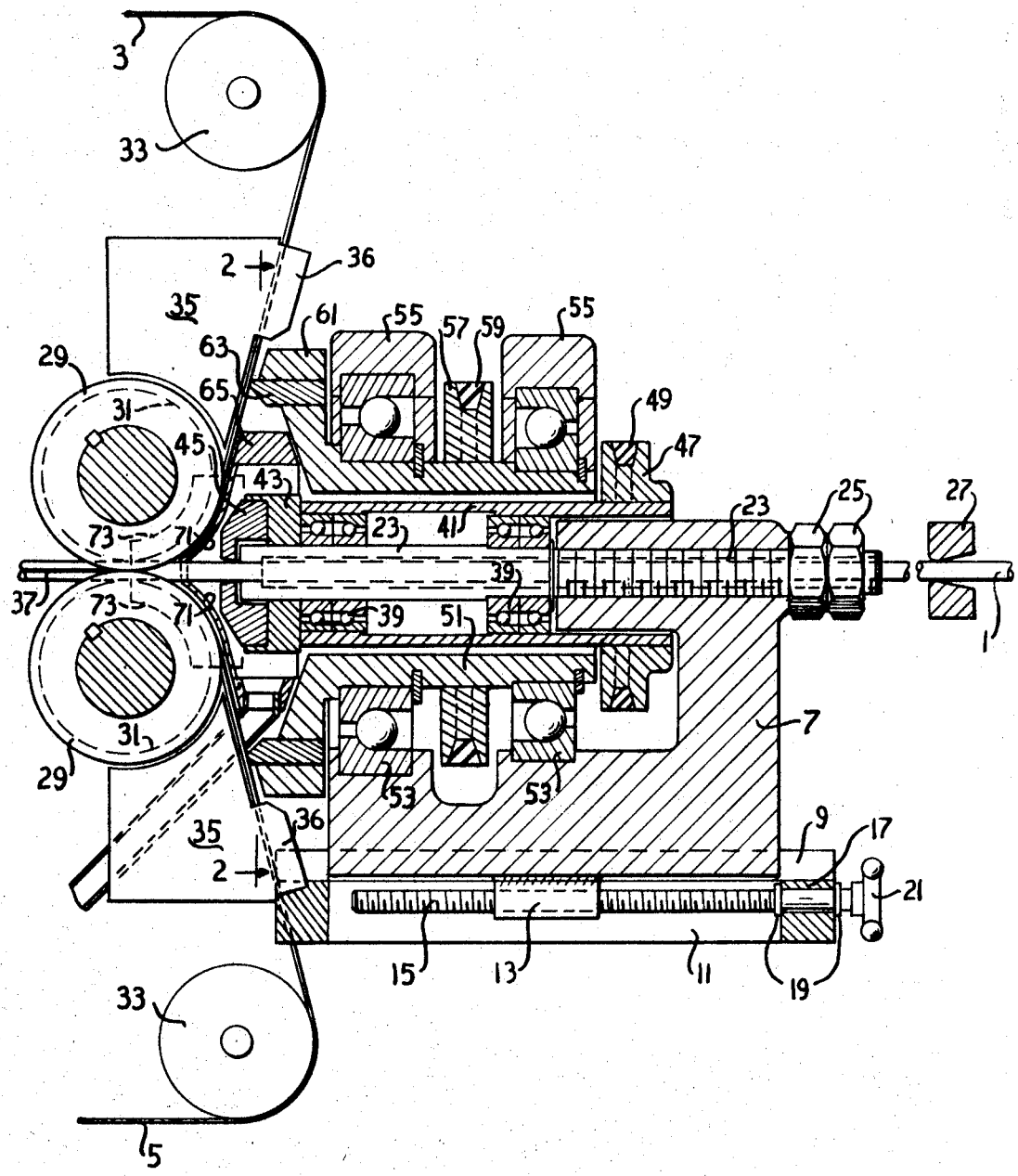
Figure 2:
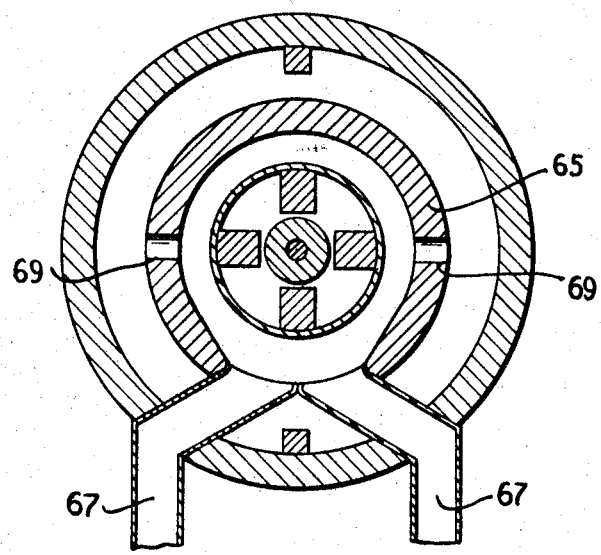

In the accompanying drawings, in which one of various possible embodiments of the invention is illustrated, FIG. 1 is an axial section of typical apparatus embodying the invention; and FIG. 2 is a cross section taken on line 2—2 of FIG. 1.

Corresponding reference characters indicate corresponding parts throughout the several views of the drawings.

The term wire as used herein is intended to comprehend rods, tubes and the like which may be solid or hollow.

It is known that dissimilar metals may be bonded in the solid phase by squeezing them together with suitable reductions in their combined cross sections, provided the surfaces of the metals to be bonded have been sufficiently, i.e., meticulously cleaned, as taught in United States Patents 2,691,815 and 2,753,623. In the case of some metals, such as copper and aluminum, the squeezing together of these metals with suitable reduction must occur very soon after cleaning, for otherwise bond-deterrent films rapidly form. This is particularly true in the case of aluminum on the surfaces of which adherent oxides rapidly reform after cleaning.

Another problem is presented when it is desired, for example, to clad aluminum wire with copper cladding. In this case there are geometrical limitations on the amount of reduction that can be applied during the solid-phase squeezing process. By means of the present invention strips of copper may be rapidly and strongly clad on aluminum wire, for example, by use of small reductions on the order of 3% to 7% or so.

Referring now more particularly to the drawings, there is shown at numeral 1 an aluminum core wire. To be clad on this wire by solid-phase bonding are copper strips 3 and 5. Apparatus for accomplishing this includes an adjustable fixture 7, slidable in ways, one of which is shown at 9. The ways are formed in a stationary framework 11. At 13 is shown a nut attached to the fitting 7, through which is threaded a lead screw 15, rotatably supported in a framework 11 at a bearing 17 but held against axial movement by collars 19. An operating handle for turning the screw 15 is shown at 21.

Threaded at 22 into the fitting 7 is a hollow guide tube 23 which may be adjusted in axial position and then held in a fixed position on fixture 7 by lock nuts 25. The outlet (left) end of the tube 23 is formed for a close sliding fit around the wire 1 which enters the tube 23 at its right-hand end after having passed through a sizing die 27. The wire 1 is pulled from right to left on its longitudinal axis by means of squeeze rolls 29. These rolls constitute part of a conventional rolling mill having the usual means for driving them. The peripheries of the rolls are semicircularly grooved as indicated at 31 to receive the strips 3 and 5 in the nip space between the rolls. The strips move in transversely to said axis from idler rolls 33. The rolls bend the strips around and squeeze them on and with the core wire 1. Back tension is applied to the strips 3 and 5 by conventional means (not shown) to the left of the idlers The strips 3 and 5, in moving from the idlers 33 to the rolls 29 and 31, pass over supporting guide shoes 35, which are mounted rigidly with respect to the member 11. These shoes include guide nests 36 to prevent sidewise movements of the strips. Thus the rolls 29 through their grooves 31 draw in the wire 1 and strips 3 and 5 at the same linear speed in the nip space between the rolls, bending and squeezing the strips around the core wire 1. A sufficient amount of reduction by squeezing is that amount which will permit the drawing of the material into the nip space with roll slippage which amount is on the order of 3%. This is sufficient, in view of the superior cleaning preparation to be described, for solid-phase bonding of the strips 3 and 5 on the core 1, while at the same time bonding together the margins of the strips. The marginal bonding forms sidewise fins such as 37 which are subsequently removed by conventional skiving or other suitable means (not shown).

As pointed out above, solid-phase bonding requires that the surfaces to be bonded shall be so meticulously cleaned that they shall be substantially in their virgin states. Cleaning of the core wire 1 and the strips 3 and 5 is accomplished as follows:

Supported upon bearings 39 on the tube 23 is a rotatable spindle 41 having a head 43 carrying a plurality of cutters 45. Head 43 and cutters 45 constitute a hollow mill head. The spindle 41, and consequently the cutters 45, are rotated by a sheave 47 keyed to the spindle 41 and driven by a belt 49. A suitable number of cutters 45 is from four to six or so. Their rotatable cutting edges are operative upon and around the core wire 1 as it leaves the left-hand end of the fixed guide tube 23. As shown in FIG. 1, cutting action occurs quite close to the nip space between the rolls 31. Consequently, at a suitable axial speed of the core wire 1 there will be little time lapse between the formation of the virgin surface on the wire and the time that this surface enters the roll nip with the strips 3 and 5.

The engaging surfaces of the strips 3 and 5 must also be meticulously cleaned. This is accomplished by providing a second spindle 51 outside of the spindle 41. This second spindle is supported for rotation in bearings 53 carried in pillow blocks 55 suitably attached to the fixture 7. The spindle 51 has keyed to it a sheave 57, driven by a belt 59.

The spindle 51 is provided at its left end with a head 61 in which are carried a number of cutters 63. A suitable number of these may be fourteen to sixteen or so. The head with its cutters constitute a face mill. By adjusting the position of the fixture 7 in the ways 9, the rotating cutters may be caused to strike across the lengths of the strips 3 and 5, so as transversely to remove surface material therefrom. This produces virgin surfaces on the strips shortly before they are squeezed into engagement around the core wire 1 in the nip space between the rolls 29 and 31. By moving the core wire 1 and the strips 3 and 5 at a substantial speed and rapidly rotating the cutters 45 and 63, a very short time only elapses beween the production of the virgin surfaces on the core 1 and strips 3 and 5 before these surfaces come together for reduction by the squeeze rolls 29. Since this time is very short, and very clean surfaces engage one another, only a small amount of reduction is required to effect a good solid-phase green bond. This green bond may be improved in the usual manner by subsequent heat-treatment or annealing of the clad wire after it has left the rolls 29. As above-mentioned, a 3% to 7% reduction in the cross-sectional area of the composite entering the rolls is sufficient for a good bond.

Following are some practical figures for a suitable operation: Aluminum wire of commercial tolerance (±.015) is procured which is .020 to .025 inch larger in diameter than the finish size required. This wire is fed through the sizing die 27, which makes the wire round and also reduces the diameter to within .006 to .007 inch of the finish size before rolling. The wire diameter is reduced by .006 to .007 inch by the hollow milling head constituted by the cutters 45. To assure preservation of the clean virgin surface on wire 1, cutting is accomplished without the use of lubricant.

As regards the strips 3 and 5, they are cross-machined by the face mill constituted by the mounted rotary cutters 63 to remove from .0015 to .002 inch of copper, again to produce virgin metal. The guide nests 36 hold the strips against sidewise movements as they are cross-cut.

An operation of a typical machine at a speed of 37 f.p.m. of the core wire 1 and the strips 3 and 5 will produce an exposure of the freshly machined aluminum of something less than about .2 sec. The exposure of the freshly machined copper is something less than .5 sec. At speeds of 100 to 125 f.p.m. the exposure of the aluminum to the atmosphere can be reduced to approximately .06 sec.

From the above it will be apparent that chips will be formed by the cutters 45 and 63. Chips from the cutters 45 are guided out of the apparatus by means of a chamber formed by a ring 65 around the mill head, having outlets 67 as illustrated in FIG. 2. Chips from the face mill cutters 63 fall out around the member 65. Further to reduce oxidizing effects on the exposed virgin surfaces, a neutral or reducing atmosphere may be circulated within the member 65. For this purpose inlet and outlet ports such as illustrated at 69 in FIG. 2 may be employed. In such event it is desirable to have peripheral sidewise plates 71 and 73 extend from the member 65 to the peripheries and the ends of the rolls 29, respectively, as indicated in FIG. 1. These with the ring 65 form a plenum chamber around the cutters 45.

In view of the above, it will be seen that the several objects of the invention are achieved and other advantageous results attained.

As various changes could be made in the above methods and constructions without departing from the scope of the invention, it is intended that all matter contained in the above description or shown in the accompanying drawings shall be interpreted as illustrative and not in a limiting sense.

What is claimed is:

1. Wire-cladding apparatus comprising squeeze rolls, core guide means and cladding guide means for drawing core material between the rolls in one direction while simultaneously drawing in cladding strip material substantially transversely to said direction to squeeze said materials together in the nip space between the rolls with a reduction in the sum of the cross sections of the core and strip materials for solid-phase bonding thereof, a hollow mill head located between the core guide means and the space between rolls, first means for rotating said hollow mill head circularly to cut materials from the core material to produce a clean surface thereon in approach to said rolls, a face mill and second means for rotating said face mill to cut the cladding strip material across its direction of movement to clean it in its approach to said rolls, 2. Wire-cladding apparatus comprising squeeze rolls, core guide means and cladding guide means for drawing a length of core wire between the rolls in one direction while simultaneously drawing in two strips of cladding material substantially in directions transverse to said one direction to squeeze said strips around the core wire in the nip space between the rolls with a reduction in the sum of the core and strip cross sections for solid-phase bonding thereof, hollow-mill-head cutters located between the core guide means and the space between rolls, first means for rotating said hollow-mill-head cutters circularly to cut material from the core wire to produce a clean surface thereon in approach to said nip space, face-mill cutters and second means for rotating said face-mill cutters to cut said transversely drawn cladding strips across their directions of movement to produce clean surfaces thereon in approach to said rolls.

3. Wire-cladding apparatus according to claim 2 wherein, said first rotating means comprises a sleeve mounted on said core guide means and supporting said mill-head cutters at the end of the guide means which is adjacent said rolls and wherein said second rotating means is supported on bearings carried in an adjustable fixture for rotation of said second rotating means around said sleeve, said adjustable fixture supporting said core guide means.

4. Apparatus made according to claim 3 including means for adjusting said guide means on said adjustable fixture.

5. Apparatus according to claim 3 including means positioned around said mill head for receiving chips from mill head and guiding them away from the apparatus.

6. Apparatus according to claim 5 including means for containing a protective atmosphere around the entry of the core wire and the strips to said nip space of the rolls.

7. Wire-cladding apparatus comprising squeeze rolls for drawing core wire therebetween in one direction, means for transversely guiding a pair of cladding strips into the nip space between said rolls to be squeezed around said core wire for solid-phase bonding thereto by reduction under pressure from the rolls, a fixture adjustably supported with respect to said rolls, a wire guide adjustably carried by said fixture for guiding the core wire to the nip space between the rolls, a mill head rotatable at the end of the wire guide adjacent the rolls, said mill head carrying cutters for rotatably removing material from the core wire to produce a clean surface thereon, a first rotatable sleeve borne on said guide means for rotating said mill head, a face mill carrying cutters movable to crosscut both of said transversely moving strips to remove material therefrom to produce clean surfaces thereon, and a second rotatable sleeve borne on the fixture carrying the face mill cutters and surrounding said first rotatable sleeve.

8. Apparatus according to claim 7 including means formed around said mill head for receiving and guiding chips therefrom and containing a protective atmosphere.

9. The method of manufacturing clad wire and the like comprising drawing wire core material along an axis into the nip space between squeeze rolls along with strips of cladding material which move transversely with respect to said axis and into said nip space around said core material, rotating milling head cutters around said core material, said cutters being closely adjacent the nip space between the rolls circularly to remove surface material from the core wire to present a clean surface thereon as the material moves into the nip space, and transversely rotatably milling the surfaces of said cladding strips adjacent to said rolls by means of face mill cutters to remove surface material therefrom and present clean surfaces to the clean surface of the core material upon entry of the core material and cladding strips into the nip space between the rolls.

(References on following page)

References Cited

UNITED STATES PATENTS

| | | | |
|---|---|---|---|
| 2,691,815 | 10/1954 | Boessenkool | 29—497.5 |
| 2,753,623 | 7/1956 | Boessenkool | 29—497.5 |
| 3,167,857 | 2/1965 | Saito | 29—474.1 |
| 3,220,106 | 11/1965 | Clark | 29—474.1 X |
| 3,220,107 | 11/1965 | Clark | 29—497 X |
| 3,331,120 | 7/1967 | Frost | 29—474.1 X |
| 3,350,772 | 11/1967 | Vulam | 29—497.5 X |
| 3,355,796 | 12/1967 | Frieling | 29—474.1 X |
| 3,372,465 | 3/1968 | Frieling | 29—198 X |

JOHN F. CAMPBELL, *Primary Examiner.*

R. F. DROPKIN, *Assistant Examiner.*

U.S. Cl. X.R.

29—474.1, 482, 488, 494, 497.5; 228—3, 5, 18, 44, 49